June 10, 1958 L. E. DUNLAP 2,837,973
THICKNESS ROUTER
Filed Sept. 28, 1953 4 Sheets-Sheet 1
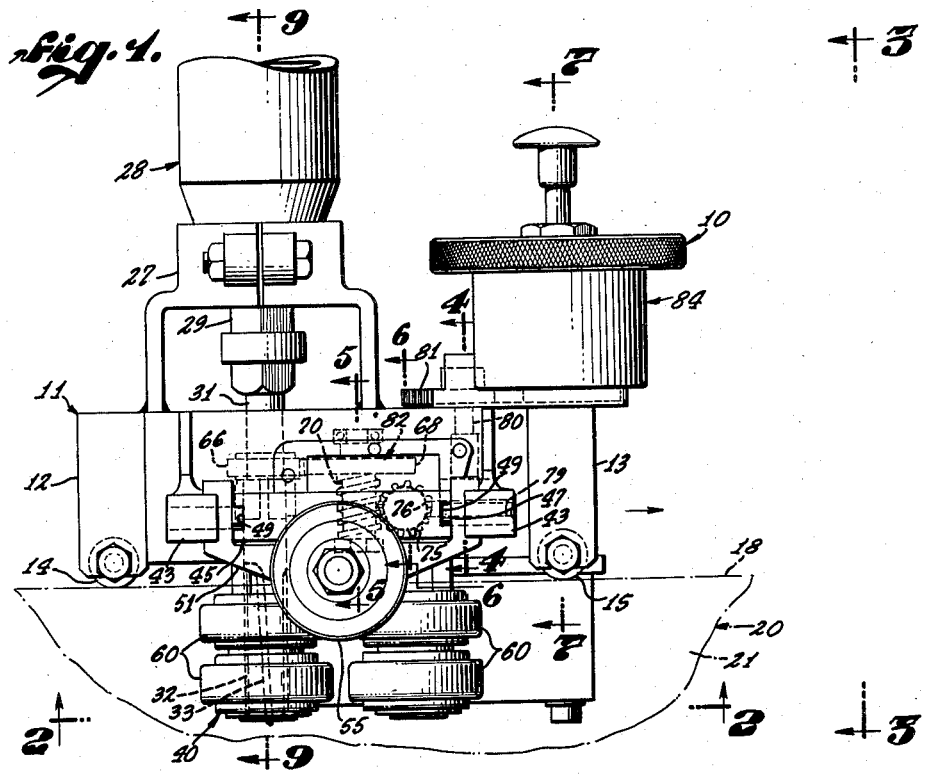
LAUREL ELTON DUNLAP,
INVENTOR.
HUEBNER, BEEHLER,
WORREL & HERZIG,
ATTORNEYS.

June 10, 1958 L. E. DUNLAP 2,837,973
THICKNESS ROUTER
Filed Sept. 28, 1953 4 Sheets-Sheet 2
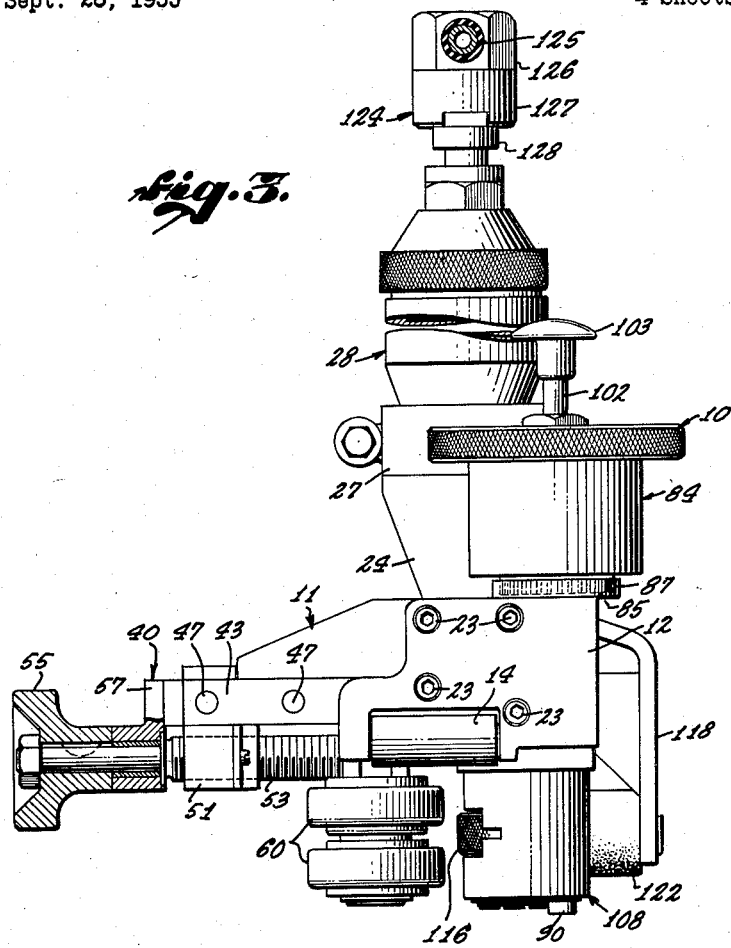
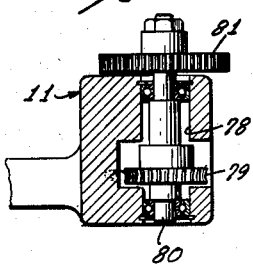
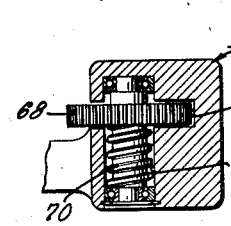
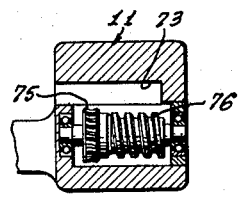
LAUREL ELTON DUNLAP,
INVENTOR.
HUEBNER, BEEHLER,
WORREL & HERZIG,
ATTORNEYS.
BY June 10, 1958  L. E. DUNLAP  2,837,973
THICKNESS ROUTER
Filed Sept. 28, 1953  4 Sheets-Sheet 3
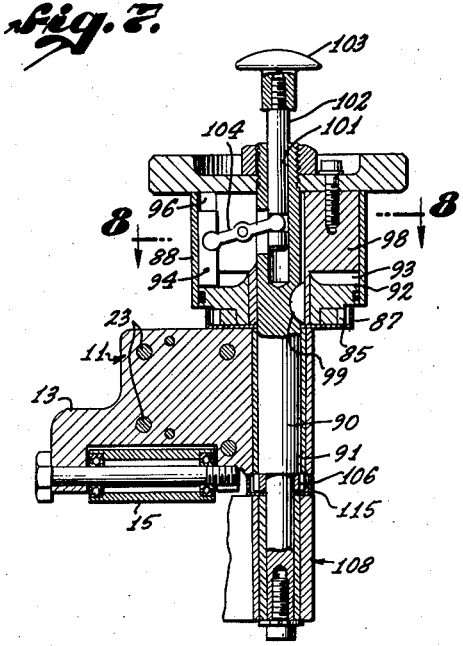
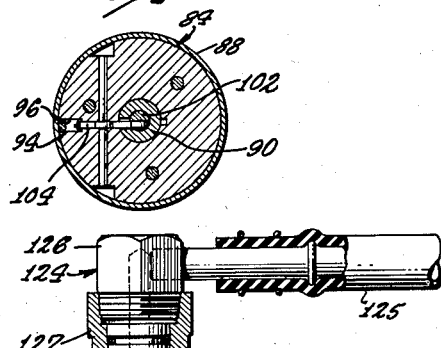
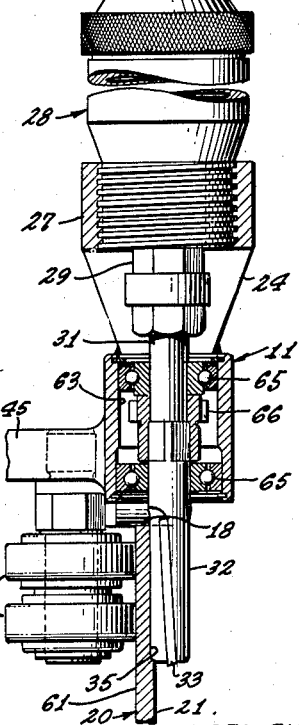
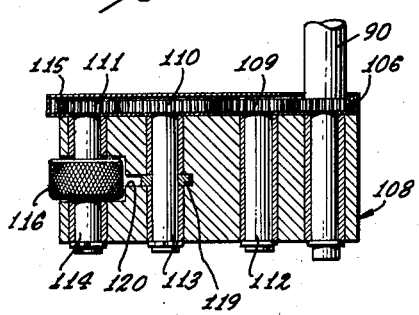
LAUREL ELTON DUNLAP,
INVENTOR.
HUEBNER, BEEHLER,
WORREL & HERZIG,
ATTORNEYS.

June 10, 1958  L. E. DUNLAP  2,837,973
THICKNESS ROUTER
Filed Sept. 28, 1953  4 Sheets-Sheet 4
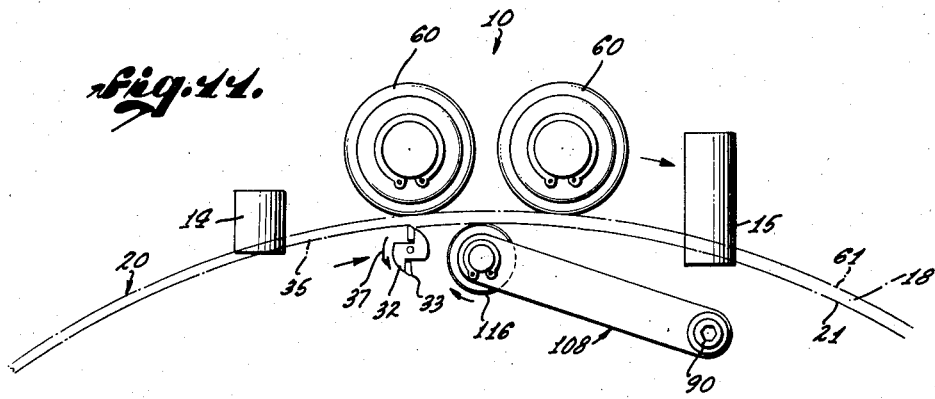
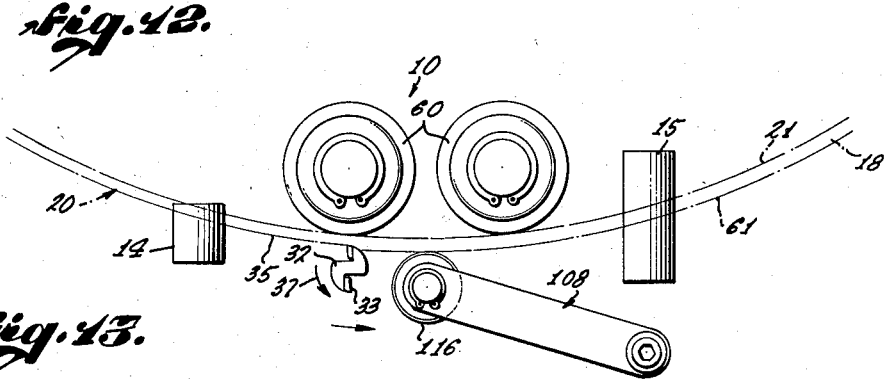
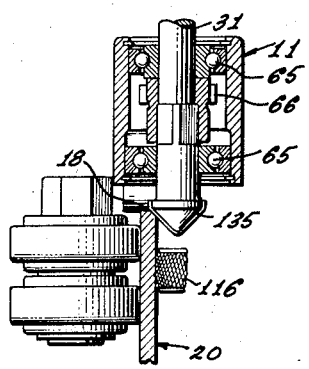
LAUREL ELTON DUNLAP,
INVENTOR.
HUEBNER, BEEHLER,
WORREL & HERZIG,
ATTORNEYS.

United States Patent Office 2,837,973
Patented June 10, 1958

2,837,973

THICKNESS ROUTER

Laurel Elton Dunlap, Van Nuys, Calif., assignor, by mesne assignments, to Zenith Plastics Company, Gardena, Calif., a corporation of Delaware Application September 28, 1953, Serial No. 382,722

2 Claims. (Cl. 90—12)

This invention relates to a thickness router and, more particularly, to a thickness router adapted to be mounted on the edge of a body whose side wall adjacent said edge is to be cut to a predetermined thickness.

In order to illustrate the construction and mode of operation of the thickness router of my invention, it will be described as utilized in cutting one or both side walls of a reinforced plastic body but, it will be understood, that the thickness router of my invention can be used to do work other than that specifically disclosed in the present application.

In manufacturing laminated plastic bodies such as domes and various other types of enclosures, it is quite difficult to maintain the cross-sectional dimension at the edge of such bodies absolutely uniform. In order to facilitate the mounting of such laminated plastic bodies and to insure the accurate reception of the edge thereof in a recess designed for the reception of said edge, it is absolutely necessary that uniform cross-sectional dimensions be preserved on the sides of the edge.

It has been customary, in the past, to utilize time-consuming and relatively inaccurate hand trimming or grinding methods whereby the desired cross-sectional dimension of the edge has been achieved by filing or trimming the side walls at the edge of the reinforced or laminated plastic body until the desired cross-sectional dimension was achieved. Obviously, the time-consuming aspects of the prior art processes and the relative inaccuracy of the results achieved have been factors materially increasing the cost of producing laminated or reinforced plastic bodies.

It is therefore an object of my invention to provide a thickness router for cutting one or both side walls adjacent a trimmed edge of a body to obtain a predetermined dimension at said edge and, more particularly, to provide a self-contained thickness router which can be mounted upon said edge and supported thereupon for self-propelled movement in reference thereto.

An additional object of my invention is the provision of a thickness router of the aforementioned character which includes means engageable with the edge of the body, said means supporting the thickness router for movement with reference to said edge.

Another object of my invention is the provision of a thickness router of the aforementioned character which includes a cutter, said cutter being juxtaposed to the side wall of the body which it is desired to cut to a required dimension, said cutter being adjustable toward or away from the side wall to increase or reduce the depth of the cut made thereby.

An additional object of my invention is the provision in a thickness router of the aforementioned character of a motor mounted on the carriage of the router which provides motive power for the aforementioned cutter thereof.

A further object of my invention is the provision in a thickness router of drive means engageable with the object upon which the router is mounted, said drive means serving to propel the router along the aforesaid edge of the object or body to translate the cutter with respect to the side wall upon which the cutter is operating.

An additional object of my invention is the provision in a thickness router of a carriage, said carriage including roller means engageable with an adjacent edge of a body upon which the thickness router is to operate and said carriage being provided with a motor and cutter and drive means energizable by said motor.

Another object of my invention is the provision of a thickness router of the aforementioned character having clutch means designed to de-energize the drive means while still permitting the operation of the cutter by the aforesaid motor.

An additional object of my invention is the provision in a thickness router of the aforesaid character of a speed reduction means interposed between the motor on the carriage and the drive means therefor to permit the drive means of the carriage to carry the carriage along the edge of the body at a relatively reduced rate of speed.

Another object of my invention is the provision in a thickness router of adjustment means for varying the depth of the cut made by the cutter in the side of the object upon which the cutter is operating.

Another object of my invention is the provision of adjustment means which includes roller means engageable with the side of the body opposite that on which the cutter is operating, said roller means being mounted upon a laterally movable slide on the carriage and the energization of said slide causing relative movement between said carriage and the edge of the body upon which the carriage is mounted to cause concomitant movement in the same direction of the cutter mounted thereupon to move the cutter toward or away from the side of the body upon which it is operating.

Another object of my invention is the provision in a thickness router of the aforementioned character of drive means which is pivotally suspended upon the carriage of the router and which has associated therewith spring means for biasing said drive means into operative engagement with the adjacent side wall of the body upon which the cutter is operating.

An additional object of my invention is the provision in a thickness router of the aforementioned character of roller means which are fastened to the opposite ends of the carriage of the thickness router and which are designed to engage the edge of the body being operated upon to permit the drive means to translate said thickness router upon said edge.

A further object of my invention is the provision of a thickness router which can be easily mounted upon the edge of a body whose side walls are to be trimmed, which is compact in construction and relatively light-weight, which consists of a minimum number of component parts and which can be utilized to trim one or both side walls of the body to be trimmed by merely reversing the orientation of the thickness router.

Other objects and advantages of my invention will be apparent from the following specification and the accompanying drawings which are for the purpose of illustration only and in which:

Figure 1 is a side elevational view of a thickness router constructed in accordance with my invention.

Figure 2 is a bottom plan view taken from the broken line 2—2 of Figure 1.

Figure 3 is an end elevational view taken from the broken line 3—3 of Figure 1.

Figure 4 is a vertical, partly sectional view taken from the broken line 4—4 of Figure 1.

Figure 5 is a vertical, partly sectional view taken from the broken line 5—5 of Figure 1.

Figure 6 is a vertical sectional view taken on the broken line 6—6 of Figure 1.

Figure 7 is a vertical, partly sectional view taken on the broken line 7—7 of Figure 1.

Figure 8 is a transverse sectional view taken on the broken line 8—8 of Figure 7.

Figure 9 is a vertical, partly sectional view taken from the broken line 9—9 of Figure 1.

Figure 10 is a vertical sectional view taken on the broken line 10—10 of Figure 2.

Figure 11 is a schematic view showing the manner in which a thickness router constructed in accordance with my invention can operate upon the interior side wall adjacent an edge of a body.

Figure 12 is a view similar to Figure 11 showing the manner in which a thickness router constructed in accordance with my invention can be caused to operate on the exterior side wall of a body.

Figure 13 is a view showing the use of a thickness router constructed in accordance with my invention but incorporating a bevel, rather than a straight cutter.

Referring to the drawings, and particularly to Figures 1, 2 and 3 thereof, I show a thickness router 10, said thickness router including an elongated frame or carriage 11 which has roller mounting blocks 12 and 13 secured to the opposite ends thereof and providing mountings respectively for rollers 14 and 15, said rollers engaging the previously trimmed edge 18 of a reinforced or laminated plastic body 20, a side wall 21 of which is to be cut to a predetermined dimension by the utilization of the edge router 10. Therefore, the rollers 14 and 15 serve as rotatable support means for the elongated carriage 11 of the thickness router 10 and permit the thickness router 10 to be translated freely along the trimmed edge 18 in a manner to be described in greater detail below.

The roller mounting blocks 12 and 13 are secured respectively to the rear and forward ends of the thickness router 10 and are affixed thereto by the use of fasteners 23 such as Allen screws or the equivalent thereof. Fastened, as by means of welding, to the upper surface of the elongated carriage 11 of the thickness router 10 is a bracket 24, said bracket incorporating a clamp 27 in which is secured the lower end of an air motor 28, said air motor 28 serving as the prime mover and power source for the thickness router 10. The clamp 27 is internally threaded, as best shown in Figure 9 of the drawings, to receive the threaded lower portion of the air motor 28 and thus to secure said air motor firmly in said clamp.

Fastened to the drive shaft 29 of the air motor 28 is a drive spindle 31, best shown in Figures 1 and 9 of the drawings, said drive spindle having a vertically oriented cutting tool or router 32 mounted thereupon, said cutting tool being provided with elongated carbide blade cutters 33. Figure 9 of the drawings graphically shows the manner in which the cutter 32 can make a cut 35 in a side wall 21 of the body 20 as the thickness router 10 traverses the edge 18 of said body. It should also be noted at this juncture that the cutter 32 is mounted for rotation in a climb-cut direction which is contrary to conventional router practice, but I have discovered that the rotation of the cutter in the direction exemplified by the arrows 37 in Figures 2, 11 and 12 of the drawings produces results not hitherto obtainable with conventional directions of rotation of similar router cutters.

The sheet or body edge 18, especially as viewed in Figure 2, need not be, and ordinarily has not been, straight but can be tortuous or curved, and this router apparatus is characterized by its ability to travel over or along any such non-straight edge.

Mounted on the frame or carriage 11 of the thickness router 10 is adjustment means 40 for the cutter 32, said adjustment means being operatively connected to the carriage 11 of the thickness router 10 by integral, laterally extending, spaced mounting arms 43 on said carriage, as best shown in Figures 2 and 3 of the drawings. The adjustment means 40 includes a slide 45 which is mounted for lateral movement between the arms 43 by means of dowel pins 47 secured in said arms and operable in slots 49 provided in the lateral edges of the slide 45.

A yoke 51 is also secured to the lateral arms 43 between the outermost ends thereof and mounts a micrometer screw 53, said screw having a calibrated micrometer head 55 associated therewith and connected to the outermost end of the slide 45 by means of a journal block 57. The rotation of the micrometer head 55 causes concomitant rotation of the micrometer screw 53 and concomitant lateral shifting of the slide 45 between the arms 43 to move the slide toward or away from the adjacent side of the body 20.

Mounted upon the innermost end of the slide 45 are two pairs of steel guide rollers 60 which constitute portions of the adjustment means 40 of my invention and which are adapted to engage a side 61 of the body 20 opposite the side wall 21 upon which the cutter 32 is intended to operate. It can, therefore, be seen that since the rollers 60 on the slide 45 are disposed in contiguity to the side wall 61 of the body 20 opposite the side wall 21 against which the cutter 32 is juxtaposed that movement of the slide 45 toward the adjacent side wall 61 of the body 20 will cause concomitant movement of the rollers 60 mounted thereupon toward said side wall, thus drawing the carriage 11 of the thickness router 10 toward the opposite side wall 21 and moving the cutter 32 into closer contiguity with the opposite side wall 21 upon which a cut 35 is to be made.

The provision of the micrometer head with its associated calibrations permits of extremely fine adjustment of the cutter 32 so that the most precise cuts can be made on the sides of the body adjacent the edge 18 thereof to permit the cross-sectional dimension of the edge 18 to be cut precisely. It should be noted at this juncture that the guide rollers 60 are disposed in spaced pairs and serve materially to stabilize the carriage 11 of the thickness router 10 on the edge 18 of the body 20 in addition to serving the function of moving the cutter 32 toward or away from engagement with the associated side wall 21 of the body 20.

The specific manner in which the router cutter 32 is mounted in the elongated carriage 11 of the thickness router 10 is clearly shown in Figure 9 of the drawings wherein the vertical bore 63 in the carriage 11 is shown as being provided with spaced bearings 65 which support the shank of the router cutter 32 to prevent lateral displacement thereof under load during the cutting process.

Suspended on the shank of the router cutter 32, and between the inner races of the bearings 65 is a drive gear 66 which is, as best shown in Figures 1, 2 and 9 of the drawings, in driving engagement with a driven gear 68, said driven gear being disposed in a cavity 69 provided in the elongated housing 11 of the thickness router 10 and having operatively connected thereto a drive worm 70 which is disposed in an elongated bore 71 in the housing 11. The router cutter 32 is in driving engagement with the drive gear 66 as by means of a mating male and female square section.

Disposed in a bore 73 in the carriage 11, as best shown in Figures 1 and 6, is a pinion 75, said pinion being driven from the worm 70 and having operatively connected thereto a worm 76.

Located in a cavity 78 in the elongated carriage 11 is a driven pinion 79, said pinion being in mesh with the worm 76 and being operatively connected through a shaft 80 to a spur gear 81 located at the top of the carriage 11. The gearing just described constitutes a portion of a reduction gear train designed to reduce the speed of the motor 28, for a purpose which will be described in greater detail below.

Interposed in the reduction gear train which is indicated generally at 82 in Figure 1 of the drawings, is a clutch means 84 best shown in Figures 1, 3 and 7 of the drawings. The clutch means 84 includes a driven gear 85 which is in mesh with the gear 81 on the top of the carriage 11. The driven gear 85 and the driving gear 81 are enclosed in a guard or housing 87 while the clutch means 84 is located in a cylindrical housing 88. An elongated shaft 90 extends upwardly through the housing 88 and is located centrally thereof, said shaft being journaled in a vertical bore 91 provided in the roller mounting block 13 at the forward end of the elongated carriage 11.

Mounted for rotation on the shaft 90 within the housing 88 is a clutch plate 92, said clutch plate being provided with radiating recesses 93 in the upper surface thereof which are engageable by a clutch dog 94 which is slidable within the housing 88 and in a slot 96 provided in a substantially cylindrical mounting member 98, said mounting member 98 being keyed as at 99 to the elongated shaft 90.

The upper end of the elongated shaft 90 is provided with a vertical bore 101, said bore receiving a plunger 102 which has mounted upon the uppermost end thereof a push button 103. A lever 104 is pivotally mounted in the mounting block 98 and has its opposite ends connected, respectively, to the plunger 102 and the clutch dog 94. Therefore, when the plunger 102 is pushed downwardly in the bore 101, the lever 104 is rotated to shift the clutch dog 94 upwardly out of engagement with the recess 93 on the clutch plate 92 in which it is located to free the mounting block 98 from operative engagement with the gear train 82.

Conversely, when the elongated plunger 102 is moved upwardly in the bore 101, the dog 94 is shifted downwardly by the lever 104 to engage said dog with the face of the clutch 92. Since the clutch 92 is rotated by the gear 85, the mounting block 98 will be concomitantly rotated and rotation of the elongated shaft 90 will occur to cause simultaneous rotation of a gear 106 mounted adjacent the lower portion of the elongated shaft 90.

Pivotally mounted upon the lower end of the elongated shaft 90, as best seen in Figures 7 and 10 of the drawings, is a shaft housing 108. The shaft housing 108, as best shown in Figures 2 and 10 of the drawings, provides a support for reduction gears 109, 110, and 111 which are mounted for rotation, respectively, on shafts 112, 113, and 114. A cover 115 encloses the gears 109, 110, and 111 on the top of the shaft housing 108.

Mounted on the shaft 114 intermediate the ends thereof and extending through the shaft housing 108 is a knurled drive roller 116, said knurled drive roller being engageable with the side wall 21 being cut by the cutter 32 and being designed to drive the carriage 11 on the thickness router 10 along the edge 18 of the body 20 upon which it is mounted.

A depending bracket 118 is secured to the elongated carriage 11 of the thickness router 10, as best shown in Figures 2 and 3 of the drawings. Slidably secured to the lowermost end of the bracket 118 is an elongated tie bar 119, the innermost end of which is, as best shown in Figure 10 of the drawings, engageable with the periphery of the shaft 113 intermediate the ends thereof through a slot 120 provided in the housing 108.

Encompassing the tie bar 119 and having its opposite ends biased respectively against the lowermost end of the bracket 118 and the exterior of the shaft housing 108 is a rubber spring 122 which serves to pivot the housing 108 inwardly in a direction toward an adjacent side wall such as the side wall 21 to urge the knurled drive roller 116 into driving engagement with said side wall.

The motor 28, which in the present embodiment of my invention is an air motor, is connected by means of a swivel joint 124, best shown in Figures 3 and 9 of the drawings, to a source of air under pressure through a supply hose 125. The swivel joint 124 includes a freely rotatable head 126 which is operatively connected at 127 to a coupling 128 extending upwardly from the uppermost end of the motor 28. Therefore, as the thickness router 10 traverses the edge 18 of the body 20, the swivel 124 permits the free rotation of the air hose 125 with respect to the body of the motor 28.

In Figures 11 and 12 of the drawings, the thickness router 10 is shown, respectively, as mounted upon the edge 18 of the body 20 to cut inner and outer side walls 21 and 61, respectively, of the body 20. This can be accomplished by merely locating the cutter 32 adjacent the side wall which it is desired to have cut. Also illustrated graphically in Figures 11 and 12 of the drawings is the manner in which the thickness router 10 can be utilized in cutting the side walls of bodies having varying radii in addition to cutting the side walls of bodies having relatively straight edges.

Illustrated in Figure 13 of the drawings is the utilization of a beveled cutter 135 in place of the straight shank cutter 32 previously illustrated and disclosed in order to cut a bevel on the edge of the body 20. Of course, cutters of different configurations can be installed in the thickness router 10 and it is not intended that the thickness router be limited to the utilization of any specific type of cutter.

The mode of operation of the thickness router 10 of my invention is as follows: The thickness router 10 is installed upon the edge 18 of the body 20 after said edge has been trimmed, by placing the rollers 14 and 15 in engagement with the edge 18 and by disposing the guide rollers 60 on one side of the body while the cutter 32 and the knurled drive roller 116 are disposed adjacent the side of the body to be cut. The air motor 28 is then energized to cause the rotation of the cutter, while the clutch means 84 is de-energized to disconnect the knurled drive roller 116 from its operative relationship with the air motor 28 thus preventing movement of the thickness router 10 while the cutter 32 is being adjusted with reference to the side walls of the body which is to be cut.

To accomplish the aforementioned adjustment of the cutter 32, the micrometer screw 53 is rotated by the micrometer head 55 to cause the inward movement of the slide 45 in a direction toward the side wall 61 of the body 20, thus urging the guide rollers 60 into engagement with said side wall. As the micrometer head 55 is rotated to cause the concomitant rotation of the micrometer screw 53, the relative movement between the slide 45 and the elongated carriage 11 causes inward movement of the cutter 32 toward the adjacent side wall 21. Since the cutter 32 is rotated, it will cut into the material of the side wall 21 to the desired depth.

After the desired dimension or depth of cut has been achieved by the utilization of the adjustment means 40 of the thickness router 10, the clutch means 84 can be engaged to cause the rotation of the knurled drive roller 116 and thus cause the translation of the carriage 11 of the thickness router 10 along the edge 18 of the body 20. It should be noted that, as the adjustment of the cutter 32 toward or away from the adjacent side wall 21 of the body 20 takes place, the pivotally mounted shaft housing 108 will be displaced by the compression of the spring 122 associated therewith to permit such adjustment of the cutter 32 to be accomplished while still maintaining the knurled drive roller 116 in operative engagement with the side wall 21 which is to be cut by the cutter 32.

It should be noted that while the cutter is rotated at the speed of the air motor 28, the reduction gear train 82 materially reduces the speed of rotation of the knurled drive roller 116 thus permitting the knurled drive roller 116 to translate the cutter 32 along the edge 18 of the body 20 at a moderate speed despite the relatively high speed of rotation of the motor 28 and the cutter 32 driven thereby.

After one side wall of the body 20 has been trimmed, it may be desirable to cut the other side wall thereof and this can be accomplished by merely disposing the cutter 32 in operative relation with the side wall opposite that which has been previously cut in the manner graphically illustrated in Figures 11 and 12 of the drawings.

I thus provide by my invention a thickness router which is characterized by self-mobility in that it can traverse an edge of an object to be cut under its own power and which incorporates adjustment means to permit cuts to be made on the edge of a body with extreme precision. Furthermore, both the drive means and the cutter means of the thickness router are powered by the same source of motive power which materially reduces the over-all weight of said router.

In addition, the relatively small over-all dimensions of the thickness router and the light weight thereof permit it to be readily mounted upon bodies which would not support the weight of a heavier machine.

In addition all the rollers e. g. 60 may be provided with non-slip surfaces as rubber, though the accuracy of the cutting operation is thereby ordinarily diminished.

Having thus described my invention, what I claim as new and desire to secure by Letters Patent is:

1. In a thickness router for cutting a side wall of an object adjacent an edge thereof to a predetermined thickness, the combination of: a carriage, said carriage being adapted for movement along said edge, roller means on said carriage having axes transverse to said side wall for rolling engagement with said edge and for determining the longitudinal position of said carriage; a motor on said carriage; a cutter rotatably mounted on said carriage for cutting said side wall, means engaging said cutter by said motor; a driver on said carriage engageable with said object for translating said carriage thereupon; means energizing said driver by said motor and adjustment means on said carriage engageable with said object for adjusting said cutter with reference to said side wall, said adjustment means engaging the side wall opposite that engageable by said cutter for laterally shifting the cutter in relation to said side wall, said driver and said adjusting means being on opposite sides of said wall for determining the transverse position of said carriage.

2. In a thickness router for cutting a side wall of an object adjacent an edge thereof to a predetermined thickness, the combination of: a carriage, said carriage being adapted for movement along said edge, roller means on said carriage having axes transverse to said side wall for rolling engagement with said edge and for determining the longitudinal position of said carriage; a motor on said carriage; a cutter rotatably mounted on said carriage for cutting said side wall, means energizing said cutter by said motor; a driver on said carriage engageable with said object for translating said carriage thereupon means energizing said driver by said motor; and adjustment means on said carriage engageable with said object for adjusting said cutter with reference to said side wall, said adjustment means engaging the side wall opposite that engageable by said cutter and including rollers engaging said opposite side wall and laterally shiftable in respect thereto, said driver and said adjusting means being on opposite sides of said wall for determining the transverse position of said carriage.

References Cited in the file of this patent

UNITED STATES PATENTS

| | | |
|---|---|---|
| 1,027,366 | Woods et al. | May 21, 1912 |
| 1,587,962 | Kielley | June 8, 1926 |
| 1,893,016 | Brown | Jan. 3, 1933 |
| 1,974,141 | James et al. | Sept. 18, 1934 |
| 2,140,120 | Tomarin | Dec. 13, 1938 |
| 2,216,108 | Brockway | Oct. 1, 1940 |
| 2,556,203 | Marrotte | June 12, 1951 |

FOREIGN PATENTS

| | | |
|---|---|---|
| 715,780 | Germany | Jan. 7, 1942 |
| 724,787 | Germany | Sept. 7, 1942 |